United States Patent
Khosla et al.

(10) Patent No.: US 9,177,228 B1
(45) Date of Patent: Nov. 3, 2015

(54) METHOD AND SYSTEM FOR FUSION OF FAST SURPRISE AND MOTION-BASED SALIENCY FOR FINDING OBJECTS OF INTEREST IN DYNAMIC SCENES

(71) Applicant: HRL Laboratories, LLC, Malibu, CA (US)

(72) Inventors: Deepak Khosla, Camarillo, CA (US); David J. Huber, Calabasas, CA (US); Kyungnam Kim, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 462 days.

(21) Appl. No.: 13/743,742

(22) Filed: Jan. 17, 2013

Related U.S. Application Data

(63) Continuation-in-part of application No. 12/982,713, filed on Dec. 30, 2010, now Pat. No. 8,774,517, which is a continuation-in-part of application No. 12/214,259, filed on Jun. 16, 2008, now Pat. No. 8,363,939, application No. 13/743,742, which is a continuation-in-part of application No. 13/669,269, filed on Nov. 5, 2012, which is a continuation-in-part of application No. 12/214,259, which is a continuation-in-part of application No. 11/973,161, filed on Oct. 4, 2007, now Pat. No. 8,165,407.

(60) Provisional application No. 61/589,761, filed on Jan. 23, 2012.

(51) Int. Cl.
*G06K 9/00* (2006.01)
*G06K 9/62* (2006.01)

(52) U.S. Cl.
CPC .................. *G06K 9/6289* (2013.01)

(58) Field of Classification Search
None
See application file for complete search history.

(56) References Cited

U.S. PATENT DOCUMENTS

| | | | |
|---|---|---|---|
| 6,670,963 B2 | 12/2003 | Osberger | |
| 8,699,767 B1 * | 4/2014 | Khosla et al. | 382/128 |
| 8,774,517 B1 * | 7/2014 | Khosla et al. | 382/190 |
| 2005/0047647 A1 | 3/2005 | Rutishauser et al. | |
| 2006/0285724 A1 * | 12/2006 | Tian | 382/103 |
| 2007/0173699 A1 | 7/2007 | Mathan et al. | |
| 2007/0236488 A1 | 10/2007 | Mathan et al. | |

(Continued)

FOREIGN PATENT DOCUMENTS

WO     WO03093947     11/2003

OTHER PUBLICATIONS

Ruesch et al. (2008) "Multimodal saliency based bottom up attention: a framework for the humanoid robot iCub." Proc. 2008 IEEE Int'l Conf. on Robotics and Automation, pp. 962-967.*

Huber et al. (2009) "Fusion of multi-sensory saliency maps for automated perception and control." Proc. SPIE vol. 7336.*

Itti et al. (Jan. 2001) "Feature combination strategies for saliency-based visual attention systems." J. Electronic Imaging, vol. 10 No. 1, pp. 161-169.*

(Continued)

*Primary Examiner* — Barry Drennan
(74) *Attorney, Agent, or Firm* — Tope-McKay & Associates

(57) ABSTRACT

Described is a system for object detection from dynamic visual imagery. Dynamic visual input obtained from a stationary sensor is processed by a surprise-based module. The surprise-based module detects a stationary object in a scene to generate surprise scores. The dynamic visual input is also processed by a motion-based saliency module which detects foreground in the scene to generate motion scores. The surprise scores and motion scores are fused into a single score, and the single score is used to determine the presence of an object of interest.

18 Claims, 5 Drawing Sheets

(56) References Cited

U.S. PATENT DOCUMENTS

2008/0056611 A1 3/2008 Mathan et al.
2011/0229025 A1* 9/2011 Zhao et al. .................. 382/165

OTHER PUBLICATIONS

Klein et al. (Nov. 2011) "Center-surround divergence of feature statistics for salient object detection." Proc. 2011 IEEE Int'l Conf. on Computer Vision, pp. 2214-2219.*
Khosla et al. (2009) "Biologically inspired robust and adaptive multi-sensor fusion and active control." Proc. SPIE vol. 7345.*
Khosla et al. (2009) "3d hierarchical spatial representation and memory of multimodal sensory data." Proc. SPIE vol. 7345.*
Khosla et al. (2010) "Neurally inspired rapid detection of sparse objects in videos." Proc. SPIE vol. 7697.*
D. Simon in "Kalman Fittering with State Constraints: A Survey of Linear and Noniinear Algorithms," IET Control Theory & Applications, vol. 4, issue 8, Aug. 2010, pp. 1303-1318.
Kyungnam Kim et al. in "Real-time foreground-background segmentation using codebook motet" in Real-Time Imaging, vol. 11, issue 3, Jun. 2005.
Liu et al. in "Learning to Detect a Salient Object" In Proceedings of the IEEE Conference on Computer Vision and Pattern Recognition (CVPR), Minneapolis, Minnesota. 2007.
Deng Cai et al. in "Hierarchical clustering of WWW image search results using visual, textual and link information," in the proceedings of the 12th annual ACM international conference on multimedia, pp. 952-959, 2004.
Andoni A., et al., "Near-Optimal Hashing Algorithms for Near Neighbor Problem in High Dimensions," Proceedings of the Symposium on Foundations of Computer Science (FOCS'06), 2006.
Bentin, S., et al., "Electrophysiological studies of face perception in humans," Journal of Cognitive Neuroscience, 8, 551-565, 1996.
Berg A., "Shape matching and object recognition," Ph.D. thesis, UC Berkeley, Computer Science Division, Berkeley, CA, Dec. 2005.
Berks, C., et al., "Evaluation of an EEG-workload model in an aegis simulation environment" in Proceedings of SPIE Defense and Security Symposium, 90-99, 2005.
Bhattacharyya, R., et al., "Optimal image ordering for rapid serial visual presentation using electroencephalography," Presented at Society of NeuroScience (SfN) annual meeting, Chicago, 2009.
Carpenter G.A., et al., "A massively parallel architecture for a self-organizing neural pattern recognition machine," Computer Vision, Graphics, and Image Processing, 37, 54-115, 1987.
Carpenter G.A., et al., "The what-and-where filter a spatial mapping neural network for object recognition and image understanding," Computer Vision and Image Understanding, 69, 1-22, 1998.
Carpenter G.A., "Default ARTMAP," in Proc. of the International Joint Conference on Neural Networks (IJCNN'03), 1396-1401, 2003.
Carpenter G.A., et al., "Self-organizing information fusion and hierarchical knowledge discovery: a new framework using ARTMAP neural networks," Neural Networks, 18, 287-295, 2005.
Cowell, et al., "Construction and validation of neurophysio-technological framework for imagery analysis," in J. Jacke (Ed.): Human-Computer Interaction, Part II, HCII 2007, LNCS 4551, pp. 1096-1105, 2007, © Springer-Verlag Berlin Heidelberg.
Draper B., et al., "Evaluation of Selective Attention under Similarity Transforms," In Workshop on Performance and Attention in Computer Vision. Graz, Austria, Apr. 2003.
Eckhorn R., et al., "Coherent Oscillations: A Mechanism of feature linking in the visual cortex?" Biological Cybemetics 60, 121-130, 1988.
Eimer, M., "Does the face-specific N170 component reflect the activity of a specialized eye processor?" Neuroreport, 9, 2945-2948, 1998.
Fabre-Thorpe, M., et al., "A limit to the speed of processing in Ultra-Rapid visual categorization of novel natural scenes," Journal of Cognitive Neuroscience, 13, 171-180, 2001.
Field D.J., "Relations between the statistics of natural images and the response properties of cortical cells," J. Opt. Soc. Am. A., 4: 2379-2394, 1987.
Fei-Fei L., et al., "Learning generative visual models from few training examples: an incremental Bayesian approach testod on 101 object categories," CVPR 2004, Workshop on Generative-Model Based Vision, 2004.
Gerson, A.D., et al., "Cortically coupled computer vision for rapid image search," IEEE Transactions on Neural Systems and Rehabilitation Engineering, 14(2): 174-179, Jun. 2006.
Gladwell, M., "Blink: the power of thinking without thinking," 1st ed. Little, brown and company: Time Warner Book Group, New York, 2005, pp. 18-47.
Gutin, G., et al., "Traveling salesman should not be greedy: domination of analysis of greedy-type heuristics for the TSP," Discrete Applied Mathematics, 117: 81-86, 2002.
Gray C.M., et al., "Oscillatory Responses in Cat visual cortex exhibit intercolumnar synchronization which reflects global stimulus properties," Nature 338: 334-336, 1989.
Hopf, J.-M., et al., "Localizing visual discrimination processes in time and space," The American Physiological Society, 88, 2088-2095, 2002.
Itti L., et al., "A saliency-based search mechanism for overt and covert shifts of visual attention," Vision Research, 40: 1489-1506, 2000.
Itti L., et al., "A Model of Saliency-Based Visual Attention for Rapid Scene Analysis," IEEE Transactions on Pattern Analysis and Machine Intelligence, 20, 1254-1259, 1998.
Itti L., et al., "Bayesian Surprise Attracts Human Attention," Vision Research 49: 1295-1306, 2008.
Itti, L., et al., "Computational Modeling of Visual Attention," Nature Reviews Neuroscience, 2, 194-203, 2001.
Itti, L., "Quantifying the Contributgion of low-level saliency to human eye movements in dynamic scenes," Visual Cognition, 12, 1093-1123, 2005.
Keysers, C., et al., "The Speed of Sight," Journal of Cognitive Neuroscience, 13(1), 90-101, 2001.
Khosla D., et al., "Bio-Inspired Visual Attention and Object Recognition," In: Proc. SPIE Defense, Security, and Sensing, 6560, 656003, 2007.
Khosla, D., et al., "A bio-inspired system for spatio-temporal recognition in static and video imagery," Proc. SPIE 6560, 656002, 2007.
Koch C., et al., "Shifts in selective visual attention: towards the underlying neural circuitry," Human Neurobiology, 4: 219-227, 1985.
Lazebnik S., et al., "Beyond Bags of Features: spatial pyramid matching for recognizing natural scene categories," In: Proc. IEEE Conference on Computer Vision and Pattern Recognition (CVPR), 2006.
Ling, H., et al., "Diffusion distance for histogram comparison," IEEE Computer Society Conference on Computer Vision and Pattern Recognition (CVPR), 2006.
Medasani, S., et al., "Possibilistic particle swarms for optimization," Proceedings 5673 of SPIE/IST Symposium on Electronic Imaging, 2005.
Medasani, S., et al., "Active learning system for object fingerprinting," International Joint Conference on Neural Networks, 2004.
Morrison, D., et al., "Semantic clustering of images using patterns of relevance feedback," in Proceedings of the 6th International Workshop on Content-based Multimedia Indexing (CBMI 2008), London, UK.
Nane S.A., et al., "Columbia Object Image Library (COIL-100)," Technical Report CUCS-006-96, Feb. 1996.
Navalpakkam V., et al., Modeling the Influence of Task on Attention, Vision Research, 45: 205-231, 2005.
Navalpakkam V., et al., "An integrated model of top-down and bottom-up attention for optimal detection," In: Proc. IEEE Conference on Computer Vision and Pattern Recognition (CVPR), 1-7, 2006.
Navalpakkam V., et al., "Sharing resources: buy attention, get recognition," In: Proc. International Workshop on Attention and Performance in Computer Vision (WAPCV'03), Graz, Austria, Jul. 2003.
Navalpakkam, V, et al., "Search goal tunes visual features optimally," Neuron, 53, 605-617, 2007.
Niebur E., at al., "Control of selective visual attention modeling the 'where' pathway," In D. Touretzky, M Mozer and M. Hasselmo. Neural Imformation Processing Systems (NIPS 8), 802-808, Cambridge, MA, MIT, Press 1996.

(56) References Cited

OTHER PUBLICATIONS

Orabona F., et al., "Object-based Visual Attention: A Model for a Behaving Robot," In 3rd International Workshop on Attention and Performance in Computational Vision (in CVPR 2005), San Diego, CA, Jun. 2005.

Owechko, Y., et al., "A swarm-based volition/attention framework for object recognition," IEEE Conference on Computer Vision and Pattern Recognition, San Diego, 2005.

Owechko, Y., et al., "Cognitive swarms for rapid detection of objects and associations in visual imagery," IEEE Swarm Intelligence Symposium, 2005.

Peters, R.J., et al., "Beyond bottom-up: Incorporating task-dependent influences into computational model of spatial attention," in: Proc. IEEE Conference on Computer Vision and Pattern Recognition (CVPR), 2007.

Rogowitz, B.E., et al., "Perceptual image similarity experiments," Proceedings of SPIE, 3299: 576-590, 1998.

Scholl B.J., "Objects and Attention: the state of the art," Cognition 80, 1-46, 2001.

Serre T., et al., "Object recognition with features inspired by visual cortex," in Proceedings of the IEEE conference on computer vision and pattern recognition (CVPR), San Diego, CA, Jun. 2005.

Smeulders, A., et al., "Content-based image retrieval at the end of the early years," IEEE Transactions on PAMI, 22 (12): 1349-1380, 2000.

Sun Y., et al., "Hierarchical selectivity for object-based visual attention," Submitted to Artificial Intelligence, 2004.

Sun, Y., et al., "Probabilistic judgment by a coarser scale: behavioral and ERP evidence," in Proceedings of the Twenty-sixth Annual meeting of the Cognitive Science Society, 2004.

Thorpe, S., et al., "Speed of processing in the human visual system," Nature, vol. 381, pp. 520-522, 1996.

University of California, San Diego Complex Systems and Cognition Laboratory, CSCLAB Image, Database http://csclab.ucsd.edu/labeledimages.php. 2006.

Walther D., et al, "Attentional selection for object recognition—a gentle way," Lecture Notes in Computer Science 2525: 472-479, 2002.

Wolfe J.M., "Visual Search in continuous, naturalistic stimuli," Vision Research 34: 1187-1195, 1994.

Vazirani, V., "Approximation Algorithms," Springer-Verlag, Berlin, Germany. pp. 32-33 (2004).

Vogel, E.K., et al., "The Visual NI Component as an index of a discrimination process," Psychophysiology, 2000.

Yamaguchi, S., et al., "Cerebral Asymmetry of the 'Top-down' allocation of attention to global and local features," The Journal of Neuroscience, 20, 1-5, 2000.

Zang H., et al., "SVM-KNN: Discriminative nearest neighbor classification for visual category recognition," CVPR 2006 26. Vaxirani, V., "Approximation algorithms," Springer-Verlag, Berlin, Germany, p. 32, 2004.

http://en.wikipedia.org/Traveling_salesman_problem, Dec. 2, 2009.

Richard P. Wildes, "A measure of motion salience for surveillance applications" in Proc. IEEE Int'l Conf. Image Processing, 1998.

B. Draper and A. Lionelle. Evaluation of Selective Attention under Similarity Transforms. In Workshop on Performance and Attention in Computer Vision. Graz, Austria, Apr. 2003.

R. Eckhorn, R. Bauer, W. Jordan, M. Brosch, M. Kruse, W. Munk, and H.J. Reitboeck. Coherent Oscillations: A Mechanism of Feature Linking in the Visual Cortex? Biological Cybernetics 60. 121-130, 1988.

C.M. Gray, P. Konig, A.K. Engel, and W. Singer. Oscillatory Responses in Cat Visual Cortex Exhibit Intercolumnar Synchronization Which Reflects Global Stimulus Properties. Nature 338: 334-336, 1989.

L. Itti and C. Koch. A saliency-based search mechanism for overt and covert shifts of visual attention. Vision Research, 40: 1489-1506, 2000.

L. Itti, C. Koch, and E. Niebur. A Model of Saliency-Based Visual Attention for Rapid Scene Analysis, IEEE Transactions on Pattern Analysis and Machine intelligence, 20, 1254-1259, 1998.

V. Navalpakkam, L. Itti, Modeling the Influence of Task on Attention. Vision Research, 45: 205-231, 2005.

V. Navalpakkam, and L. Itti. An integrated model of top-down and bottom-up attention for optimal object detection, In: Proc. IEEE Conference on Computer Vision and Pattern Recognition (CVPR), 1-7, 2006.

S.A. Nene, S.K. Nayar, and H. Murase. Columbia Object Image Library (COIL-100) Technical Report CUCS-006-96, Feb. 1996, http://www.cs.columbia.edu/CAVE/software/softlib/coil-100.php.

E. Niebur, C. Koch. Control of Selective Visual Attention: Modeling the 'Where' Pathway. In. D. Touretzky, M. Mozer, and M. Hasselmo. Neural Information Processing Systems (NIPS 8) 802-808 Cambridge, MA, MIT Press. 1996.

F. Orabona, G. Metta, and G. Sandini. Object-based Visual Attention: A Model for a Behaving Robto in 3rd International Workshop on Attention and Performance in Computational Vision (in CVPR 2005), San Diego, CA, Jun. 2005.

B.J. Scholl. Objects and Attention: The State of the Art Cognition 80: 1-46, 2001.

Y. Sun and R. Fisher. Hierarchical Selectivity for Object-based Visual Attention, Submitted to Artificial Intelligence, 2004.

D. Walther, L. Itti, M. Riesenhuber, T. Poggio, and C. Koch. Attentional Selection for Object Recognition—a Gentle Way. Lecture Notes in Computer Science 2525: 472-479, 2002.

J.M. Wolfe. Visual Search in Continuous, Naturalistic Stimuli, Vision Research 34: 1187-1195, 1994.

University of California, San Diego Complex Systems and Cognition Laboratory. CSCLAB Image Database. 2006, http://csclab.ucsd.edu/labeledimages.php.

C. Stauffer and W.E.L. Grimson, "Adaptive background mixture models for real-time tracking," Int. Conf. Computer Vision and Pattern Recognition, vol. 2, pp. 246-252, 1999.

A. Elgammal, D. Harwood, and L.S. Davis, "Non-parametric model for background subtraction," European Conf. Computer Vision, vol. 2, pp. 751-767, 2000.

T. Kohonen, "Learning vector quantization," Neural Networks, vol. 1, pp. 3-16, 1988.

Kyungnam Kim, Thanarat H. Chalidabhongse, David Harwood, and Larry Davis, "Realtime foreground-background segmentation using codebook model," Real-Time Imaging, vol. 11, Issue 3, Jun. 2005.

Huber, D. and Khosia, D. "A Bio-Inspired Method and System for Visual Object-Based Attention and Segmentation" Proc. SPIE 7696, 769613 (SPIE Defense, Security, and Sensing), 2010.

B. Draper and A. Lionelle. Evaluation of Seiective Attention under Similarity Transforms. In Workshop on Performance and Attention in Computer Vision. Graz, Austria, Apr. 2003.

L. Itti and P. Baldi. Bayesian Surprise Attracts Human Attention Vision Research 49: 1295-1306, 2008.

L. Itti, C. Koch, and E. Niebur. A Model of Saliency-Based Visual Attention for Rapid Scene Analysis. IEEE Transactions on Pattern Analysis and Machine Intelligence, 20, 1254-1259, 1998.

D. Khosla, C. Moore, D. Huber, S. Chelian. Bio-Inspired Visual Attention and Object Recognition. In: Proc. SPIE Defense, Security, and Sensing, 6560, 656003, 2007.

V. Navalpakkam, L. Itti, Modeling the Influence of Task on Attention, Vision Research, 45: 205-231, 2005.

F. Orabona, G. Metta, and G. Sandini. Object-based Visual Attention: A Model for a Behaving Robot. In 3rd International Workshop on Attention and Performance in Computation Vision (in CVPR 2005), San Diego, CA, Jun. 2005.

T. Kohonen, "Learning vector quantization," Neural Networks, vol. 1, pp. 3-16. 1988.

\* cited by examiner

METHOD AND SYSTEM FOR FUSION OF FAST SURPRISE AND MOTION-BASED SALIENCY FOR FINDING OBJECTS OF INTEREST IN DYNAMIC SCENES

CROSS-REFERENCE TO RELATED APPLICATIONS

This is a Continuation-in-Part application of U.S. Non-Provisional application Ser. No. 12/982,713, filed on Dec. 30, 2010, entitled, "System for Identifying Regions of Interest in Visual Imagery", which is a Continuation-in-Part application of U.S. Non-Provisional application Ser. No. 12/214,259, filed on Jun. 16, 2008, entitled, "Visual Attention and Segmentation System."

This application is ALSO a Continuation-in-Part application of U.S. Non-Provisional application Ser. No. 13/669,269, filed on Nov. 5, 2012, entitled, "Motion-Seeded Object Based Attention for Dynamic Visual Imagery", which is a Continuation-in-Part application of U.S. Non-Provisional application Ser. No. 12/214,259, filed on Jun. 16, 2008, entitled. "Visual Attention and Segmentation System", which is a Continuation-in-Part application of U.S. Non-Provisional application Ser. No. 11/973,161, filed on Oct. 4, 2007, entitled, "Visual Attention and Object Recognition System", now issued as U.S. Pat. No. 8,165,407.

This application is ALSO a Non-Provisional patent application of U.S. Provisional Application No. 61/589,761, filed in the United States on Jan. 23, 2012, titled, "A Method and System for Fusion of Fast Surprise and Motion-Based Saliency for Finding Objects of Interest in Dynamic Scenes."

GOVERNMENT LICENSE RIGHTS

This invention was made with government support under U.S. Government Contract Number W31P4Q-08-C-0264. The government has certain rights in the invention.

BACKGROUND OF THE INVENTION (1) Field of Invention

The present invention relates to a system for object detection from dynamic visual imagery and, more particularly, to a system for object detection from dynamic visual imagery that fuses surprise-based object detection with motion processing based object detection.

(2) Description of Related Art

Several systems exist that detect anomalies in a scene, such as for surveillance applications. Such systems typically employ an attention algorithm (i.e., saliency) as a first pass that analyzes the entire scene and extracts regions of interest, which are typically advanced to some other system for analysis and/or identification. The attention algorithm is also often used as a seed to a "surprise" algorithm that finds salient regions of interest that change and, therefore, could be a potential anomaly in the field-of-view (FOV). The attention and surprise algorithms must be very accurate, as any event that is not detected by these algorithms cannot be analyzed by subsequent algorithms in the system. However, since attention/surprise must be processed on every pixel in the imagery from a wide FOV, the attention/surprise algorithm requires a large amount of computational resources and often requires hardware to run the algorithms. Depending on the hardware used to run the algorithm, the requirement may either exceed the available resources of the hardware or require larger and more complex hardware (e.g., multiple field-programmable gate arrays (FPGAs)), which results in bulky and high-power systems.

The pure surprise algorithms (both feature and object-based) are incomplete because they yield poor results when applied to video imagery of a natural scene. Artifacts from ambient lighting and weather often produce dynamic features that can throw off a saliency algorithm and cause it to think that "everything is salient". Mathematically, it may be the case that everything in the scene is salient, but when a system is tasked with a specific purpose, such as surveillance, one is only interested in legitimate short-term anomalies that are likely to be targets. Therefore, simple saliency systems cannot provide the service that the current invention does.

An alternative approach to "pure surprise" is to use a full surprise algorithm. Full surprise algorithms employ a great deal of additional processing on the features in each frame of the video and create statistical models that describe the scene. If anything unexpected happens, the surprise algorithm is able to return the location of the happening. The closest known prior art to this invention is the surprise algorithm of Itti and Baldi (see the List of Cited Literature References, Literature Reference No. 2). The work of Itti and Baldi employs a Bayesian framework and features that contribute to the saliency map to construct a prior distribution for the features in the scene. The current saliency map is used as the seed for a "posterior" distribution. This algorithm uses the Kullback-Leibler divergence (or KL distance) between the prior and posterior as the measure of surprise. KL distance is a non-symmetric measure of the difference between two probability distributions. Because it takes the entire history of the scene into account, it exhibits a much lower false alarm rate than that of a system that exclusively uses saliency.

However, as one might expect from the description of the algorithm, the Itti and Baldi surprise algorithm (see Literature Reference No. 2) is very complicated and computationally expensive. It was designed to run on very high-end computer hardware, and even then cannot currently run at real-time on high-resolution video imagery. The computer hardware it runs on is very bulky and power-consuming, which prevents its use on a mobile platform. Furthermore, the complexity of the algorithm largely prevents it from being ported to low-power hardware, which is essential for deployment on a mobile platform.

Furthermore, several additional researchers have shown interest in systems that compute the saliency of a scene. Two particular theories have emerged from this interest: attention that focuses on features at specific loci in the scene, and attention that focuses on the saliency of specific objects or colored "blobs" in a scene. These methods are called feature-based and object-based attention, respectively.

Feature-based algorithms work at the pixel level and compute attention based on the saliency of a given location within the scene at a specific location. The attention work of Itti and Koch (see Literature Reference No. 3) employs such an approach, which computes attention by constructing a saliency map from a set of biologically inspired features extracted from the image. The algorithm breaks apart the image into a set of Gaussian pyramids corresponding to color, intensity, and orientation at a series of scales, which are combined across scales and merged into the saliency map. The system attends to the point that corresponds to the maximum value in the saliency map, applies inhibition of return to that location, and shifts to the next most salient point. This process continues until the program attends to a maximum number of locations, or the user terminates the program. The most significant problem with the method described in Literature Reference No. 3 is its inefficiency; in spite of the inhibition of return mechanism, the algorithm routinely returns to previously attended locations if a better point is not found. The algorithm lacks the type of queuing system required to efficiently attend to every location in the image. Some groups have also found that this algorithm does not exhibit invariance to the orientation of a scene: when the algorithm analyzes the same image twice, one being slightly rotated relative to the other, it returns dramatically different salient regions for each.

The work described in Literature Reference No. 12 employs motion processing using a codebook in order to extract anomalous motion patterns from a series of frames in video. The work described in Literature Reference No. 12 is capable of processing motion information from dynamic imagery. However, the blobs it returns sometimes leave out pieces of objects or are incomplete.

Each of the prior methods discussed above exhibit limitations that make them incomplete. This is due to the problems that they exhibit in their limited application to natural scenes and in their theoretical structure. Thus, a continuing need exists for an improved system for finding surprised-based objects of interest in dynamic scenes.

SUMMARY OF THE INVENTION

The present invention relates to a system for object detection from dynamic visual imagery and, more particularly, to a system for object detection from dynamic visual imagery that fuses surprise-based object detection with motion processing based object detection. The system comprises one or more processors and a memory having instructions such that when the instructions are executed, the one or more processors perform multiple operations including receiving dynamic visual input obtained from a stationary sensor. The dynamic visual input is processed by a surprise-based module. The surprise-based module detects at least one stationary object in a scene to generate a plurality of surprise scores. The dynamic visual input is also processed by a motion-based saliency module, wherein the motion-based saliency module detects foreground in the scene to generate a plurality of motion scores. At least one of the plurality of surprise scores is fused with at least one of the plurality of motion scores into a single score, wherein the single score is used to determine the presence of at least one object of interest in the dynamic visual input.

In another aspect, the plurality of motion scores are processed through a normalization function that constrains a score domain for each motion score to between zero and one.

In another aspect, at least one score from a set of N scores selected from the plurality of surprise scores is fused with at least one score from a set of N scores selected from the plurality of motion scores, wherein each set of N scores represents scores from a set of predetermined locations of interest in the scene.

In another aspect, a maximum number of scores to analyze for a given period of time is determined, wherein a fixed number of scores are fused from each of the plurality of surprise scores and the plurality of motion scores.

In another aspect, all of the scores from one of the plurality of surprise scores or the plurality of motion scores are used for fusion.

In another aspect, at least one surprise score of the plurality of surprise scores is fused with at least one motion score of the plurality of motion scores, wherein the at least one surprise score and the at least one motion score comprise at least one target in the same spatial location in the scene.

As can be appreciated by one skilled in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
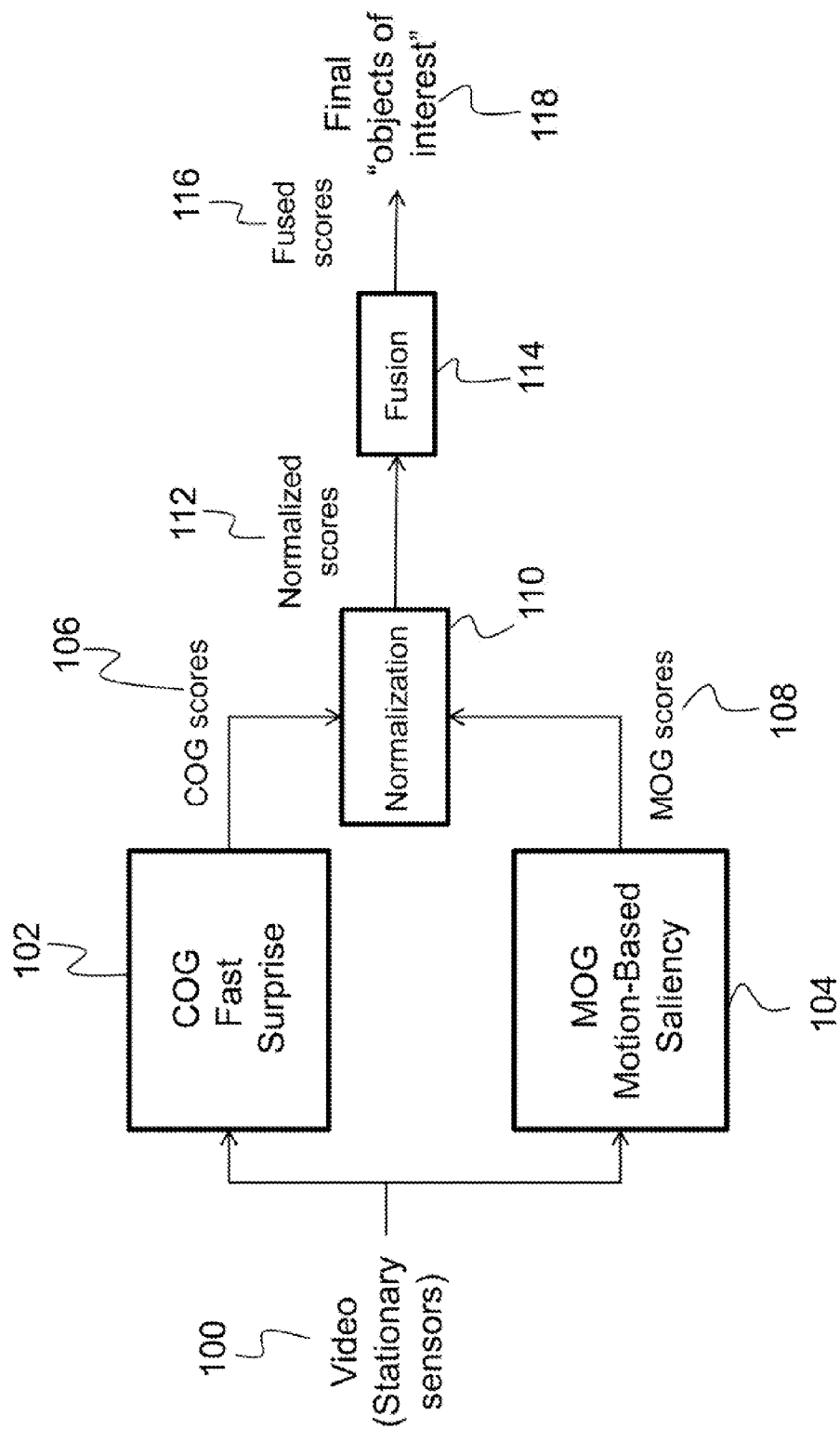
FIG. 1 is a flow diagram depicting a system for fusion of fast surprise and motion-based saliency for object detection according to the present invention.

The present invention relates to a system for object detection from dynamic visual imagery and, more particularly, to a system for object detection from dynamic visual imagery that fuses surprise-based object detection with motion processing based object detection. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Subsequently, a description of various principal aspects of the present invention is provided. Finally, specific details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. B. Draper and A. Lionelle. Evaluation of Selective Attention under Similarity Transforms. In *Workshop on Performance and Attention in Computer Vision*. Graz, Austria, April 2003.
2. L. Itti and P. Baldi. Bayesian Surprise Attracts Human Attention. *Vision Research* 49: 1295-1306, 2008.
3. L. Itti and C. Koch. A saliency-based search mechanism for overt and covert shifts of visual attention. *Vision Research*, 40: 1489-1506, 2000.
4. L. Itti, C. Koch, and E. Niebur. A Model of Saliency-Based Visual Attention for Rapid Scene Analysis. *IEEE Transactions on Pattern Analysis and Machine Intelligence*, 20, 1254-1259, 1998.
5. D. Khosla, C. Moore, D. Huber, S. Chelian. Bio-Inspired Visual Attention and Object Recognition. In: *Proc. SPIE Defense, Security, and Sensing*, 6560, 656003, 2007.
6. V. Navalpakkam, L. Itti, Modeling the Influence of Task on Attention. *Vision Research*, 45: 205-231, 2005.
7. V. Navalpakkam, and L. Itti. An integrated model of top-down and bottom-up attention for optimal object detection, In: *Proc. IEEE Conference on Computer Vision and Paten Recognition (CVPR)*, 1-7, 2006.
8. F. Orabona, G. Metta, and G. Sandini. Object-based Visual Attention: A Model for a Behaving Robot. In $3^{rd}$ *International Workshop on Attention and Performance in Computational Vision* (*in CVPR* 2005), San Diego, Calif., June 2005.
9. C. Stauffer and W. E. L. Grimson, "Adaptive background mixture models for real-time tracking," Int. Conf. Computer Vision and Pattern Recognition, Vol. 2, pp. 246-252, 1999.
10. A. Elgammal, D. Harwood, and L. S. Davis, "Non-parametric model for background subtraction," European Conf. Computer Vision, Vol. 2, pp. 751-767, 2000.
11. T. Kohonen. "Learning vector quantization," Neural Networks, Vol. 1, pp. 3-16. 1988.
12. Kyungnam Kim, Thanarat H. Chalidabhongse, David Harwood, and Larry Davis, "Realtime foreground-background segmentation using codebook model," Real-Time Imaging, Volume 11, Issue 3, June 2005.

(2) Principal Aspects

The present invention has three "principal" aspects. The first is a system for object detection for dynamic visual imagery. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for object detection for dynamic visual imagery. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Specific Details (3.1) Fast Surprise Cognitive Algorithm (COG)

The COG process is described in detail in U.S. application Ser. No. 12/982,713 entitled, "System for Identifying Regions of Interest in Visual Imagery" (hereinafter referred to as the '713 application), which is hereby incorporated by reference as though fully set forth herein. A summary is given below for the sake of completeness.

The first step in COG is to compute a series of feature maps representing color contrasts, intensities, and motion patterns from a series of consecutive static color images of a scene representative of continuous frames in a video. Note that this can be the full frame or gridded sub-images. If the image sequence is in black and white, it is converted into an RGB format (red-channel (r), green-channel (g), and blue-channel (b)) where all three channels have the same value (retaining the black-and-white appearance) for feature map calculation. The image is further broken (split) into four fully-saturated channels (red (R), green (G), blue (B), and yellow (Y)) that yield zero-response to white, as follows:

$$R = r - \frac{(g+b)}{2},$$

$$G = g - \frac{(r+b)}{2},$$

$$B = b - \frac{(r+g)}{2},$$

and $$Y = \frac{(r-g)}{2} - \frac{|r-g|}{2} - b.$$

Additionally, a pair of intensity channels, a light intensity channel (L) and a dark intensity channel (D), are calculated from the input image by averaging the red, green, and blue channels, as follows:

$L=(r+g+b)/3$ and

D=(maximum value of a color channel (e.g., 255))−L.

Additionally, according to the principles of the present invention, center-surround color maps corresponding to the receptive fields in the retina for red-center/green surround, green-center/red-surround, blue-center/yellow-surround, bright-center/dark-surround, and dark-center/bright-surround and for the motion channels (center and surround are from motion in the same direction) are computed from the input channels from the Difference of Gaussians (DoG) between an "ON" center feature, and a contrasting "OFF" surround feature. Both the center and surround channels are convolved with a two-dimensional Gaussian kernel, where the surround kernel has larger bandwidth than the center kernel. A feature map is computed when the surround channel is subtracted from the center channel. In instances where opponency is calculated (such as with color and intensity), the opponent maps are added before normalization; this ensures that the feature map is unbiased toward one contrasting feature over another. This process is repeated for each center-surround channel pairing, which includes each of the color and intensity contrasts, and the motion directions. Each feature map is normalized between zero and one. The resulting set of feature maps indicates anomalous regions along that particular feature within the still frame of the scene, and each frame in the video sequence generates its own series of feature maps.

Up until this point, the method for computing saliency and surprise is identical. After computing feature maps, these processes diverge. The next step is to compute a baseline or "status quo" within the scene for each feature, so that the system can detect when an event occurs that disagrees with the historical distribution of features within the scene. In accordance with the principles of the present invention, a "prior map," $P_x$, is computed for each feature, x, by integrating the sequence of feature maps over time. There are many possible ways to integrate the information from a temporal series of feature maps into a prior map, but the simplest process is through a weighted expected value (without implying a limitation, an example weighted expected value might be the mean), where more recent frames provide a stronger influence on the prior map than frames encountered long ago. For a given feature, x, this can be expressed for any spatial location i,j in the map at any time i as follows:

$$P_x(i, j; t) \sum_{T=0}^{t} w_x(T) F_x(i, j; T),$$

where $F_x(i,j; T)$ represents the feature map for a feature x at location i,j at some previous time T, and where the weights $w_x$ follow a decay pattern determined by some time constant $\tau$, for example:

$$w_x(T) = k_x e^{-(t-T)/\tau_x}.$$

The values of $k_x$ must be chosen such that for the entire recorded history, $T_n$, of some feature, x, $$\sum_{T_n} w_x(T_n) = 1$$

is true. The time constant, $\tau_x$, affects how quickly the prior map will "forget" the input of older feature maps, and at some point, depending on the required precision of the application, $k_x$ may become small enough that the older maps may be ignored. Therefore, $T_n$ may be expressed as a fixed value when sufficient samples have been taken. Depending on the framerate (and as a non-limiting example), an acceptable value of $T_n$ may be between ten and one hundred frames of video. Thus, in practice, the amount of history to remember, which saves memory and doesn't make require recomputation of $k_x$ for each new timestep, is capped. In theory, there is no limit to the size of $T_n$; however, in practice the weights will eventually tend close enough to zero to safely ignore the oldest feature maps.

This method requires the storage of $T_n$ feature maps, which is generally not difficult as these maps are generally decimated from the original image. According to the principles of the present invention, as new frames are processed, the new feature maps are integrated into the existing prior maps, ensuring that they always remain up-to-date with the most current features of the scene. This is particularly important if the system is meant to be run for a long period of time, where atmospheric and lighting conditions are likely to change over the course of the sequence. While there is no specified training period and the system can begin to generate surprise maps immediately after the system begins to process frames, it is generally a good idea to allow the prior map to stabilize before further processing the results.

The prior map may stabilize one of a few ways. In an embodiment of the principles of the present invention, when the scene being observed is quiet (i.e., the scene dynamics are predictable), stabilization may be declared when the average per-pixel variance between several consecutive prior maps drops below some predetermined threshold that depends on the required precision of the application and the range of pixel values. In other words, the prior map is stabilized when new feature maps no longer cause the pixel values in the prior map to fluctuate. Alternatively, when the scene being observed is very dynamic, stabilization requires that the memory has stored $T_n$ frames. The value of $T_n$ depends on the memory constraints and weighting factors of the system (i.e., how quickly the weights $w_x(T)$ tend to zero). At this point, the prior map is considered "stable" even if its pixel values continue to fluctuate somewhat.

In alternative embodiments according to the principles of the present invention, this system could employ different time scales for the weighting. As a non-limiting example, one set of weights could use a time constant, rx, that is larger, and hence the weights decay more slowly, placing increased emphasis on older values, while a set of weights corresponding to a shorter time scale could be employed to emphasize more recent events. If this method is employed, then the prior map would be equal to some normalized combination of the maps from these two time scales.

Once the system has generated a relatively stable prior map, meaning that either its pixel values have ceased to fluctuate or $T_n$ frames have been captured and integrated into the prior map, the principles of the present invention include the generation of the surprise map. The first step is to compute the rectified difference between each feature map for the newest frame (at time t+1) and its corresponding prior map according to the following:

$$SFM_{ij}(t+1) = |P_{ij}(t) - F_{ij}(t+1)|.$$

The resulting map provides a spatial map for each feature that shows how much the current scene deviates from the norm for that feature. These are known as surprise feature maps (SFMs), and are analogous to the feature maps in the generic saliency algorithm. In accordance with the principles of the present invention, the surprise feature maps that correspond to a given feature type are added and normalized to create surprise conspicuity maps (SCMs): color SFMs are added together and normalized to create a color SCM, motion SFMs combine to form a motion SCM, and so on. Finally, the SCMs are added together and normalized to create a surprise map. After surprise is computed for the frame, the feature maps are integrated into the appropriate prior maps, so that they are updated with the most recent information.

According to the principles of the present invention, a method of top-down biasing of the surprise algorithm can be obtained by applying weights to each of the surprise feature maps and surprise conspicuity maps during their addition. The top-down biasing can be combined with a user feedback loop, in which the user indicates which regions returned by the surprise algorithm contain a target, versus those that are false alarms. For example, for each false alarm indicated by the user, the system could look at the surprise feature map values that contributed to the erroneous surprise score and decrease the weight of the surprise feature maps that contributed most strongly to the surprise score (how to adjust the weights is arbitrary). In this way, the system is unlikely to return the same region of interest for the same reason as it originally did. However, since the inhibition is specialized to a fixed subset of channels, this provides the advantage that if an event actually occurs in that region of the scene, the surprise system will not be blind to it due to the inhibition.

It should be noted that while the aforementioned example assumes that the sensors on the system are cameras collecting video data, a similar surprise algorithm can be devised for any type of sensory input. Therefore, this system can be applied to any type of sensor array. For the purpose of the present invention, it is assumed that the surprise is computed in hardware as a black box, whose only inputs are the current frame of sensor data, the previous frame of sensor data (for dynamic feature computations), and the most recent set of prior maps, which are updated and returned by the hardware as each frame is processed. This level of abstraction maximizes the applicability of the system, and reduces the need to cater to specific nuances of the surprise algorithm. In fact, the present invention does not depend on the specific implementation of the surprise algorithm apart from the memory structures that are stored.

(3.2) Motion-Based Saliency Algorithm (MOG)

While COG by itself works and produces good results, there is a need to improve the accuracy of detection and reduce false alarms alarms by factoring in the motion of objects. A module based on a Motion-Based Saliency Algorithm (MOG) is used to detect foreground, which can include moving objects, from a video taken by a stationary camera. In the present application, foreground is defined as regions that violate a trained background model. The MOG process is described in detail in U.S. application Ser. No. 13/669,269, filed on Nov. 5, 2012, entitled, "Motion-Seeded Object Based Attention for Dynamic Visual Imagery" (hereinafter referred to as the '269 application), which is hereby incorporated by reference as though fully set forth herein.

The motion-based saliency technique used in the present invention is based on modeling the background and subtracting it from the input image. In one embodiment, the method according to the principles of the present invention includes constructing and updating the background model by the codebook-based method (see Literature Reference No. 12). It adopts a quantization/clustering method (see Literature Reference No. 11) to construct a background model from observation sequences. For each pixel, it builds a codebook consisting of one or more codewords. Samples at each pixel are clustered into the set of codewords based on a color distortion metric together with a brightness ratio. Not all pixels have the same number of codewords. The background is encoded on a pixel by pixel basis. Thus, a pixel is represented by a codebook which consists of one or multiple codewords. Each codeword contains an RGB-vector and other features such as the minimum and maximum brightness that the codeword accepted; the frequency with which the codeword has occurred; the maximum negative run-length (MNRL) defined as the longest interval during the training period that the codeword has not recurred; the first and last access times that the codeword has occurred. These feature values are effectively used to evaluate color and brightness differences, filter out non-background pixels, and recycle unused codewords.

One advantageous characteristic of the codebook technique is its use of a color model that separates the color and brightness distortion evaluations to cope with the problem of illumination changes such as shading and highlights. The color and brightness conditions are satisfied only when the pure colors of the input pixel and the codeword are close enough, and the brightness of the input pixel lies between the acceptable brightness bounds of the codeword (see Literature Reference No. 12).

The codebook which encodes every incoming pixel in the training set is referred to as the fat codebook. In the temporal filtering step, the fat codebook is refined by separating the codewords that might contain moving foreground objects from the true background codewords, thus allowing moving foreground objects during the initial training period. The true background, which includes both static pixels and moving background pixels, usually is quasi-periodic (i.e., values recur in a bounded period). This motivates the temporal criterion of MNRL ($\lambda$), which is defined as the maximum interval of time that the codeword has not recurred during the training period. A codeword having a large $\lambda$ will be eliminated from the codebook. Even though a pixel has a large frequency 'f', its large $\lambda$ means that it is mostly a foreground event which was stationary only for that period f. On the other hand, a pixel with a small f and a small $\lambda$ could be a rare background event occurring quasi-periodically.

Subtracting the current image from the background model is straightforward. Unlike the Mixture-of-Gaussian method (see Literature Reference No. 9) or the kernel-based method (see Literature Reference No. 10), which compute probabilities using costly floating point operations, the codebook method of the present invention does not involve probability calculation. Indeed, the probability estimate in the kernel-based method is dominated by the nearby training samples. The codebook method simply computes the distance of the sample from the nearest cluster mean. The computation is very fast and shows little difference in detection compared with the probability estimate. The pixel is detected as a foreground if no acceptable matching codeword exists. Otherwise, it is classified as a background.

As described in the '269 application, once foreground pixels are detected, the post-processing steps are followed with noise removal, surface cleaning, and morphological operations. Then the connected component labeling algorithm is performed to group foreground pixels into meaningful blobs. Additional blob information such as centroid, aspect ratio, ground point, and principal body axis angle is extracted to be used in the subsequent modules.

(3.3) Normalization

The present invention combines the COG and MOG modules described above into a system for detecting objects of interest, as illustrated in FIG. 1. This is particularly useful because each of these processes attaches to different features of the scene and processes them in different ways. For example, with a video 100 obtained from at least one sensor as input, the COG module 102 can find stationary targets very quickly and accurately, which is something that the MOG module 104 is unlikely to do. However, the MOG module 104 is used to detect foreground, which can include moving objects. Because the computational processes between the COG module 102 and the MOG module 104 are so different, the score domains of these processes are naturally mismatched. Therefore, to properly fuse the scores (COG scores 106 and MOG scores 108) from each of these processes, they must undergo normalization 110 to be constrained into the same dynamic range.

In a desired aspect, there is a "training period" allowed in which the processes are allowed to run normally, but the maximum and minimum scores from each system are recorded and stored, as well as the mean and variance of the scores. To normalize, the MOG scores 108 are processed through a normalization 110 function that constrains the score domain to between zero and one. Throughout the training period, the statistics of each of the score populations are constantly updated as new scores come in; at the end of the training period, the maximum and minimum scores encountered are locked. After normalization 110, both the COG scores 106 and the MOG scores 108 are between zero and one and normalized (normalized scores 112); hence, the scores can be easily combined through a fusion process 114. The resulting fused scores 116 aid in detection of final "objects of interest" 118.

To perform normalization on incoming MOG scores 108, a fixed number of initial samples (a "normalization training period") taken from baseline activity are used to generate parameters that are used to normalize. This normalization scheme is designed to constrain scores that do not exhibit a limitation on their domain into a [0,1] range that properly reflects their score distribution without any prior knowledge of the distribution or magnitude of the MOG scores 108. COG scores 106 are already constrained to the [0,1] range.

To normalize in accordance with the principles of the present invention, a fixed number of MOG scores 108 from the beginning of a run are examined. During this time, it is optimal that the environment being monitored be in a "baseline state", where any activity to be detected does not occur. This allows the normalization process to assume that all scores within this time period are from background noise. From the samples obtained from this time period, a running tally of the minimum score, maximum score, sum-of-scores, and the number of samples is kept. By keeping this running tally, the system is able to update the normalization parameters in real-time.

The normalization procedure of the present invention comprises two processing stages. First, the values obtained by running tally are converted into an approximate distribution mean and standard deviation. For some training set of MOG scores 108 of size N with sum $S_\Sigma$, maximum value $S_{max}$, and minimum value $S_{min}$, the mean and standard deviation of the distribution may be approximated as:

$$S_\mu = S_\Sigma/N$$

and $$S_\sigma = (S_{max} - S_{min})/4,$$

where $S_\mu$ and $S_\sigma$ represent the approximate score mean and standard deviation, respectively. The approximate mean is defined as the average of the individual scores, while the approximate standard deviation takes advantage of a well-known heuristic.

If one assumes that the scores are normally distributed, one can establish an upper and lower expected threshold for the allowable range of MOG scores 108 from the approximation of the mean and standard deviation. This allows for manipulation of what normalized score the average will be (similar to "grading on a curve"). The upper and lower thresholds, $T_U$ and $T_L$ are computed as:

$$T_U = S_\mu + K_0 S_\sigma$$

and $$T_L = S_\mu - K_1 S_\sigma,$$

where $K_0$ and $K_1$ are constants that adjust the spread and the location of the mean within the score distribution. These parameters determine the mapping of the unbounded MOG score 108 domain to the [0, 1] normalization domain and should be determined experimentally such that the entire [0,1] range is employed without saturating the bounds; setting $K_0$ and $K_1$ to be low values will create a tight constraint that may cause many of the scores to exceed the threshold values and be locked into 0 or 1 values, while setting $K_0$ and $K_1$ to be large values will create a loose constraint that may pack all MOG scores 108 into a small range of scores in the middle of the distribution.

In a non-limiting experimental implementation of the present invention, $K_0$ was set to 4.0 and $K_1$ was set to 2.0 which showed a good spread of scores that covered the entire [0,1] range. Since it is assumed that the "normalization training period" occurs during a time when the system only observes background (i.e., no objects that one wants to detect), more range is allowed above the average in anticipation of higher scores when targets do appear. Scores that are lower than the baseline average are generally uninteresting, and their normalized scores may fall below zero with little consequence. Conversely, scores that are higher than the baseline average may or may not be critical detections, and it is desirable to employ as much of the remaining [0,1] range as possible to maximize the ability to discriminate between threats and very convincing false positives.

Finally, to generate normalized values within the [0,1] range from unbounded MOG scores 108, a sigmoid function is applied to each of the incoming MOG scores 108. Any score that falls above or below the thresholds $T_U$ or $T_L$ is rectified to 1 or 0, respectively, which is why selection of $K_0$ and $K_1$ is important. Scores that fall between the thresholds are normalized to a [0,1] score using:

$$S = \begin{cases} 0 & s < T_L \\ 1 & s > T_U \\ \dfrac{s - T_L}{T_U - T_L} & \text{otherwise} \end{cases}$$

In this instance, S is the normalized [0,1] score, whereas s is the unnornmalized MOG score 108.

In practice, the normalization procedure of the present invention is applied to all scores from MOG, including those that contribute to computing the normalization parameters during the "normalization training period". The scores used in the "normalization training period" are normalized using the incomplete normalization parameters and are not as reliable as those generated after the normalization training period has completed. However, processing of scores using the incomplete normalization parameters ensures that all MOG scores 108 are properly constrained into a [0,1] range.

(3.4) Fusion

Referring to FIG. 1, the next step is the fusion 114 of the normalized scores 112 into a single score. In one aspect of the present invention, the top N scores from across the MOG and COG normalized scores 112 were selected. These top N scores represent the predetermined plurality of "locations of interest". Using this methodology, the final list of target locations may have any mixture of scores from the two different algorithms.

In another embodiment according to the principles of the present invention, the maximum number of targets (scores) to analyze for a given period of time is predetermined, and a fixed number of targets from each algorithm are taken. For example, one could take the five highest MOG targets and the five highest COG targets for a total of ten targets. Or the targets could be apportioned unevenly. For instance, the first three targets from motion and the first seven targets from surprise could be taken, for a total often targets.

An alternative embodiment according to the principles of the present invention employs an additional alternative strategy depending on the specific scenario. In one embodiment, the method according to the principles of the present invention uses all available targets (scores) provided by the MOG module and then fill out the remaining available vacancies on the list with targets from the COG module.

In addition to the fusion strategies outlined above, the principles of the present invention include the employment of more advanced methods of fusion between the MOG and COG processes that take into account the spatial location of targets returned between the two modules and look for common locations. Regions within the scene that are returned by both the COG and MOG processes are assigned higher priority than targets that are either found by one process or the other. Since it is unlikely that the individual processes will return the exact same spatial locations in the scene (unless a target is extremely obvious), a simple processing for field effects may be used (e.g., if the individual algorithms return points within N pixels of one another in Euclidean distance, then they are considered to be from the same target).

To summarize, input video 100 from the sensor(s) is sent to both the COG module 102 and the MOG module 104. Each module processes the video independently, as described above, and outputs scores (i.e., COG scores 106 and MOG scores 108). In a desired aspect, each video image frame is gridded into small regions (sub-images), and each sub-image is the unit of processing. The COG module 102 and the MOG module 104 process each sub-image and output a score for each. High scores correspond to sub-images in the scene (video) that contain potential "objects of interest". As described above, these scores (COG scores 106 and MOG scores 108) are then normalized through a normalization 110 function, and the normalized scores 112 are fused 114 to output final fused scores 116 for each of the sub-images. Fused scores 116 that exceed a predetermined threshold or the top N score sub-images are the final "objects of interest" 118 in that frame. The process then repeats for all frames in the input video 100.

(3.5) Experimental Results

Figure 2:
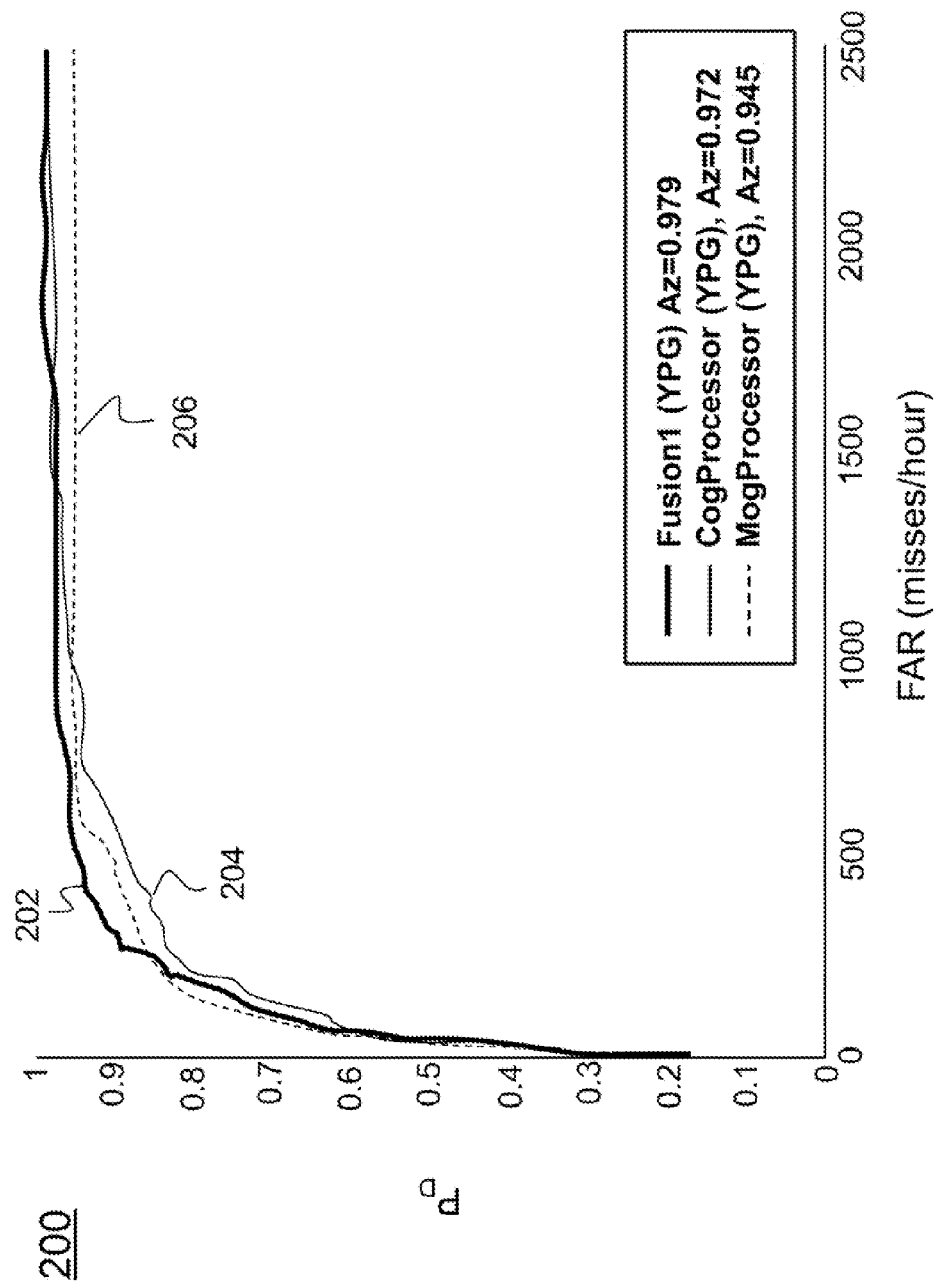
FIG. 2 is a receiver operating characteristic (ROC) plot comparing object detection success between the fusion of surprise and motion-based saliency modules, and each surprise and motion-based saliency module alone using an approximately equal number of motion and surprise targets according to the present invention.

In order to test the invention described herein, a video sequence was obtained from a stationary 10 megapixel camera overlooking a desert scene where dismounts and vehicles are objects of interest. FIG. 2 is a graph 200 illustrating the fusion results, which utilized the aspect where approximately equal number (e.g., 13 motion targets, 12 surprise targets) of top scores were taken from the MOG module and the COG module and combined to determine the objects of interest. For the Fusion experiment, any time that the MOG module did not return 13 motion targets, the remaining vacancies were filled by surprise targets. Note that the Fusion1 receiver operating characteristic (ROC) curve 202 is significantly better than the COG ROC curve 204 and the MOG ROC 206 curve independently. The false alarm rate (FAR) in misses per hour is along the x-axis, while the probability of detection ($P_D$) is on the y-axis.

Figure 3:
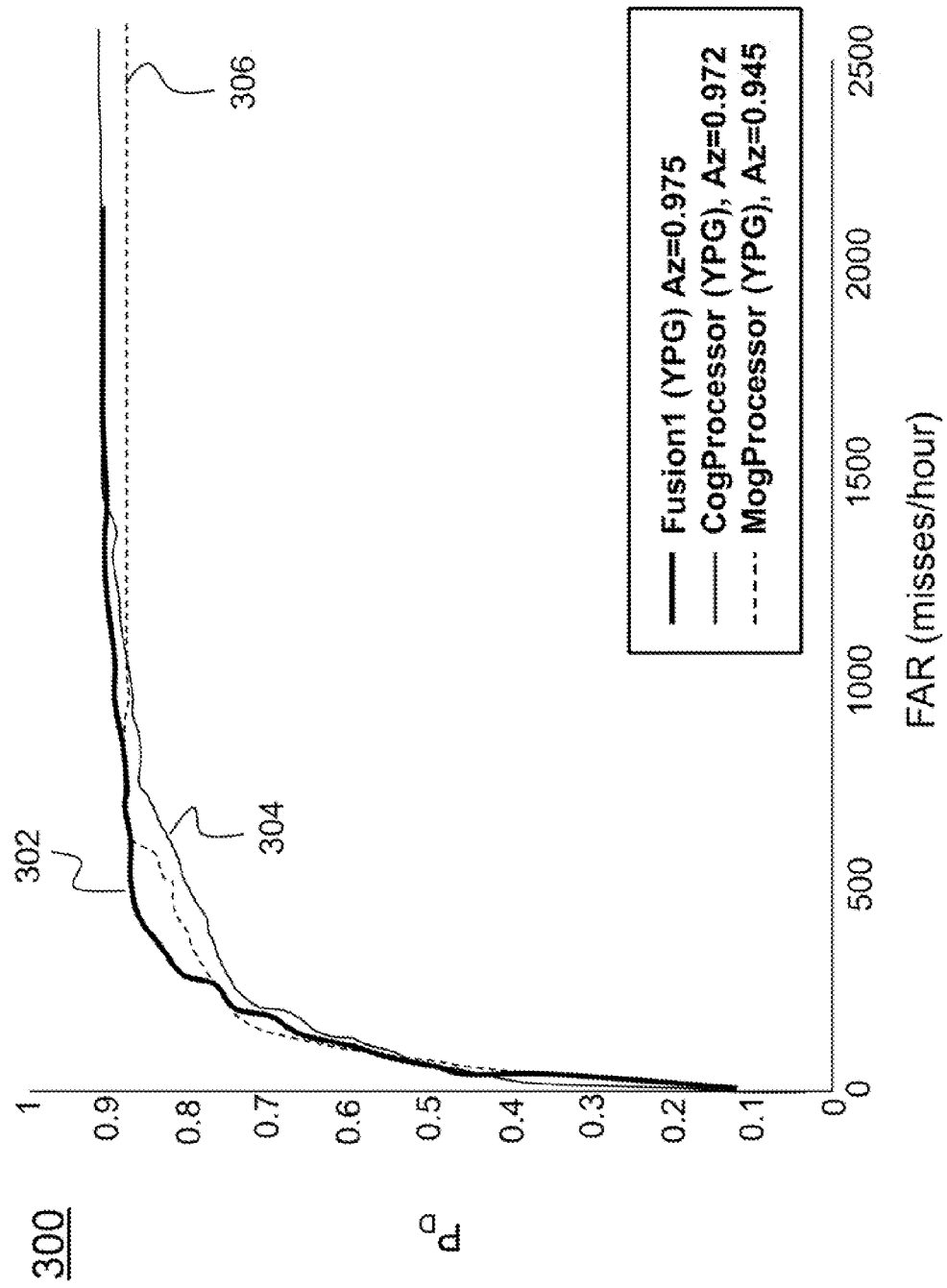
FIG. 3 is a ROC plot comparing object detection success between the fusion of surprise and motion-based saliency modules, and each surprise and motion-based saliency module alone using all of the available targets provided by the motion-based module, and the remaining vacancies are filled with targets from the surprise module according to the present invention.

In an alternative experimental test of the present invention, the fusion (Fusion0) involved all of the available targets provided by the MOG module, and the remaining vacancies (e.g., up to 25) were filled with targets from the COG module. FIG. 3 is a graph 300 illustrating the fusion results of the experiment. As in the test described above, the Fusion0 ROC curve 302 (representing the present invention) indicates better object detection than the COG ROC curve 204 or the MOG ROC 206 curves.

Figure 4:
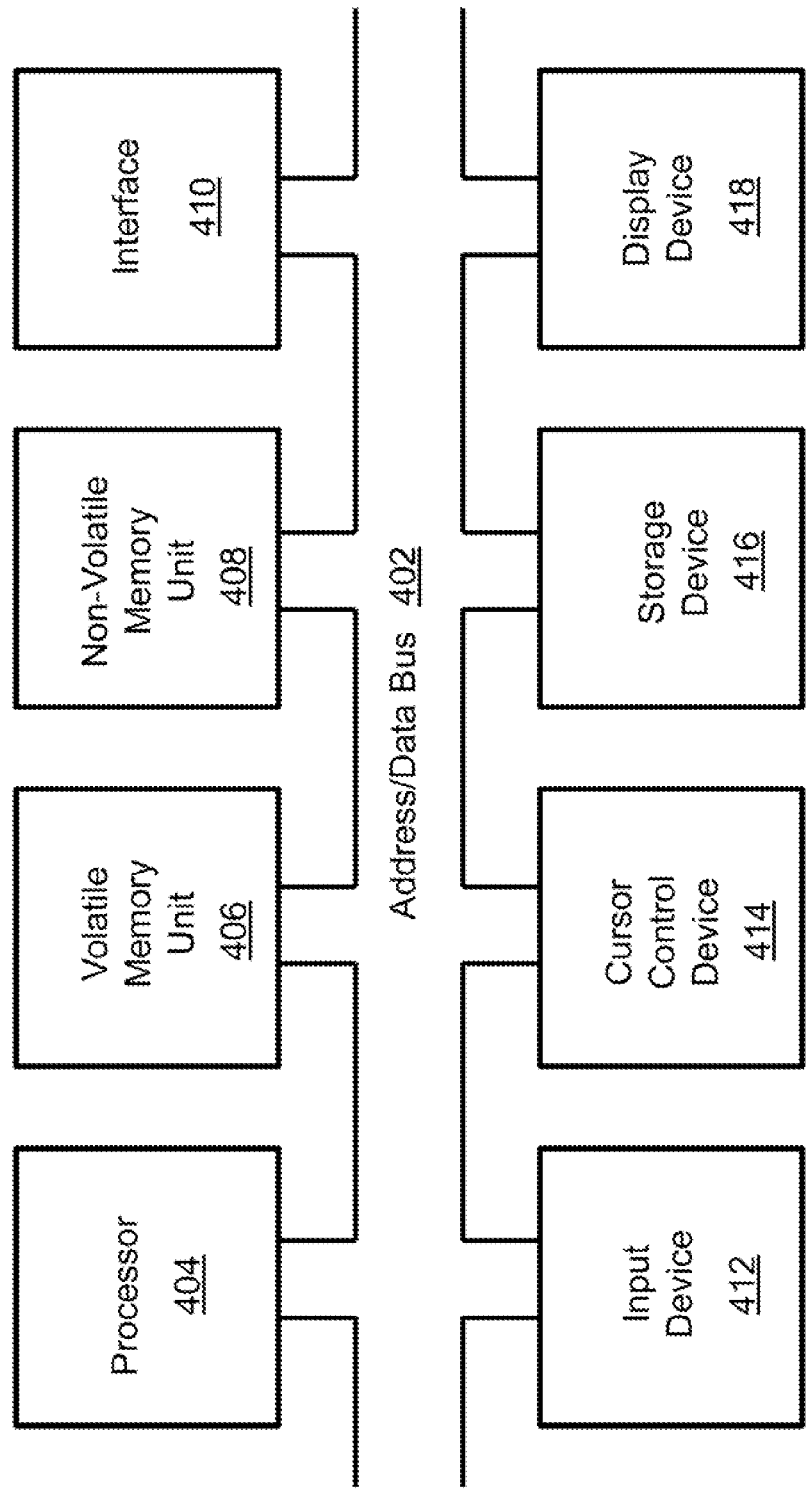
FIG. 4 is an illustration of a data processing system according to the present invention.

An example of a computer system 400 in accordance with one aspect is shown in FIG. 4. The computer system 400 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 400. When executed, the instructions cause the computer system 400 to perform specific actions and exhibit specific behavior, such as described herein.

The computer system 400 may include an address/data bus 402 that is configured to communicate information. Additionally, one or more data processing units, such as a processor 404, are coupled with the address/data bus 402. The processor 404 is configured to process information and instructions. In one aspect, the processor 404 is a microprocessor. Alternatively, the processor 404 may be a different type of processor such as a parallel processor, or a field programmable gate array.

The computer system 400 is configured to utilize one or more data storage units. The computer system 400 may include a volatile memory unit 406 (e.g., random access memory ("RAM"), static RAM, dynamic RAM, etc.) coupled with the address/data bus 402, wherein a volatile memory unit 406 is configured to store information and instructions for the processor 404. The computer system 400 further may include a non-volatile memory unit 408 (e.g., read-only memory ("ROM"), programmable ROM ("PROM"), erasable programmable ROM ("EPROM"), electrically erasable programmable ROM "EEPROM"), flash memory, etc.) coupled with the address/data bus 402, wherein the non-volatile memory unit 408 is configured to store static information and instructions for the processor 404. Alternatively, the computer system 400 may execute instructions retrieved from an online data storage unit such as in "Cloud" computing. In one aspect, the computer system 400 also may include one or more interfaces, such as an interface 410, coupled with the address/data bus 402. The one or more interfaces are configured to enable the computer system 400 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 400 may include an input device 412 coupled with the address/data bus 402, wherein the input device 412 is configured to communicate information and command selections to the processor 400. In accordance with one aspect, the input device 412 is an alphanumeric input device, such as a keyboard, that may include alphanumeric and/or function keys. Alternatively, the input device 412 may be an input device other than an alphanumeric input device. In one aspect, the computer system 400 may include a cursor control device 414 coupled with the address/data bus 402, wherein the cursor control device 414 is configured to communicate user input information and/or command selections to the processor 400. In one aspect, the cursor control device 414 is implemented using a device such as a mouse, a track-ball, a track-pad, an optical tracking device, or a touch screen. The foregoing notwithstanding, in one aspect, the cursor control device 414 is directed and/or activated via input from the input device 412, such as in response to the use of special keys and key sequence commands associated with the input device 412. In an alternative aspect, the cursor control device 414 is configured to be directed or guided by voice commands.

In one aspect, the computer system 400 further may include one or more optional computer usable data storage devices, such as a storage device 416, coupled with the address/data bus 402. The storage device 416 is configured to store information and/or computer executable instructions. In one aspect, the storage device 416 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 418 is coupled with the address/data bus 402, wherein the display device 418 is configured to display video and/or graphics. In one aspect, the display device 418 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 400 presented herein is an example computing environment in accordance with one aspect. However, the non-limiting example of the computer system 400 is not strictly limited to being a computer system. For example, one aspect provides that the computer system 400 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, in one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 5:
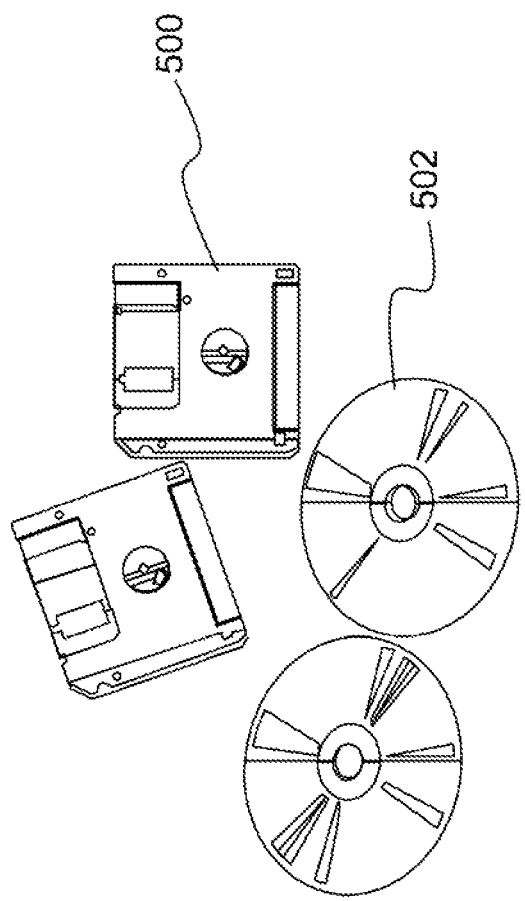
FIG. 5 is an illustration of a computer program product according to the present invention.

An illustrative diagram of a computer program product embodying the present invention is depicted in FIG. 5. As a non-limiting example, the computer program product is depicted as either a floppy disk 500 or an optical disk 502. However, as mentioned previously, the computer program product generally represents computer readable code (i.e., instruction means or instructions) stored on any compatible non-transitory computer readable medium.

The invention described herein is useful for any application that monitors a scene for the purpose of finding interesting or unusual regions or occurrences. As a non-limiting example, it can be employed in search and rescue operations or in surveillance applications where any activity is an unexpected occurrence, such as in a desert or mountain range or on the open sea. Furthermore, the system can be used as a front-end for any application that employs visual object recognition and scene understanding to extract regions of interest for identification. Other non-limiting examples of potential applications include automotive safety, factory safety and efficiency, autonomous systems, robotics, and intelligence analysis.

What is claimed is:

1. A system for object detection from dynamic visual imagery, the system comprising:
   one or more processors and a non-transitory memory having instructions encoded thereon such that when the instructions are executed, the one or more processors perform operations of:
      receiving dynamic visual input obtained from a stationary sensor;
      processing the dynamic visual input by a surprise-based module, wherein the surprise-based module detects at least one stationary object in a scene to generate a plurality of surprise scores;
      processing the dynamic visual input by a motion-based saliency module, wherein the motion-based saliency module detects foreground in the scene to generate a plurality of motion scores; and
      fusing at least one of the plurality of surprise scores with at least one of the plurality of motion scores into a single score, wherein the single score is used to determine the presence of at least one object of interest in the dynamic visual input.

2. The system as set forth in claim 1, wherein the one or more processors further perform an operation of processing the plurality of motion scores through a normalization function that constrains a score domain for each motion score to between zero and one.

3. The system as set forth in claim 2, wherein the one or more processors further perform an operation of fusing at least one score from a set of N scores selected from the plurality of surprise scores with at least one score from a set of N scores selected from the plurality of motion scores, wherein each set of N scores represents scores from a set of predetermined locations of interest in the scene.

4. The system as set forth in claim 2, wherein the one or more processors further perform an operation of determining a maximum number of scores to analyze for a given period of time, wherein a fixed number of scores are fused from each of the plurality of surprise scores and the plurality of motion scores.

5. The system as set forth in claim 2, wherein the one or more processors further perform an operation of using all of the scores from one of the plurality of surprise scores or the plurality of motion scores for fusion.

6. The system as set forth in claim 2, wherein the one or more processors further perform an operation of fusing at least one surprise score of the plurality of surprise scores with at least one motion score of the plurality of motion scores, wherein the at least one surprise score and the at least one motion score comprise at least one target in the same spatial location in the scene.

7. A computer-implemented method for object detection from dynamic visual imagery, comprising an act of causing a data processor to execute instructions stored on a non-transitory computer-readable medium such that upon execution, the data processor performs operations of:
receiving dynamic visual input obtained from a stationary sensor;
processing the dynamic visual input by a surprise-based module, wherein the surprise-based module detects at least one stationary object in a scene to generate a plurality of surprise scores;
processing the dynamic visual input by a motion-based saliency module, wherein the motion-based saliency module detects foreground in the scene to generate a plurality of motion scores; and
fusing at least one of the plurality of surprise scores with at least one of the plurality of motion scores into a single score, wherein the single score is used to determine the presence of at least one object of interest in the dynamic visual input.

8. The method as set forth in claim 7, further comprising an act of causing a data processor to perform an operation of processing the plurality of motion scores through a normalization function that constrains a score domain for each motion score to between zero and one.

9. The method as set forth in claim 8, further comprising an act of causing a data processor to perform an operation of fusing at least one score from a set of N scores selected from the plurality of surprise scores with at least one score from a set of N scores selected from the plurality of motion scores, wherein each set of N scores represents scores from a set of predetermined locations of interest in the scene.

10. The method as set forth in claim 8, further comprising an act of causing a data processor to perform an operation of determining a maximum number of scores to analyze for a given period of time, wherein a fixed number of scores are fused from each of the plurality of surprise scores and the plurality of motion scores.

11. The method as set forth in claim 8, further comprising an act of causing a data processor to perform an operation of using all of the scores from one of the plurality of surprise scores or the plurality of motion scores for fusion.

12. The method as set forth in claim 8, further comprising an act of causing a data processor to perform an operations of fusing at least one surprise score of the plurality of surprise scores with at least one motion score of the plurality of motion scores, wherein the at least one surprise score and the at least one motion score comprise at least one target in the same spatial location in the scene.

13. A computer program product for object detection from dynamic visual imagery, the computer program product comprising:
computer-readable instructions stored on a non-transitory computer-readable medium that are executable by a computer having a processor for causing the processor to perform operations of:
receiving dynamic visual input obtained from a stationary sensor;
processing the dynamic visual input by a surprise-based module, wherein the surprise-based module detects at least one stationary object in a scene to generate a plurality of surprise scores;
processing the dynamic visual input by a motion-based saliency module, wherein the motion-based saliency module detects foreground in the scene to generate a plurality of motion scores; and
fusing at least one of the plurality of surprise scores with at least one of the plurality of motion scores into a single score, wherein the single score is used to determine the presence of at least one object of interest in the dynamic visual input.

14. The computer program product as set forth in claim 13, further comprising instructions for causing a processor to perform an operation of processing the plurality of motion scores through a normalization function that constrains a score domain for each motion score to between zero and one.

15. The computer program product as set forth in claim 14, further comprising instructions for causing a processor to perform an operation of fusing at least one score from a set of N scores selected from the plurality of surprise scores with at least one score from a set of N scores selected from the plurality of motion scores, wherein each set of N scores represents scores from a set of predetermined locations of interest in the scene.

16. The computer program product as set forth in claim 14, further comprising instructions for causing a processor to perform an operation of determining a maximum number of scores to analyze for a given period of time, wherein a fixed number of scores are fused from each of the plurality of surprise scores and the plurality of motion scores.

17. The computer program product as set forth in claim 14, further comprising instructions for causing a processor to perform an operation of using all of the scores from one of the plurality of surprise scores or the plurality of motion scores for fusion.

18. The computer program product as set forth in claim 14, further comprising instructions for causing a processor to perform an operation of fusing at least one surprise score of the plurality of surprise scores with at least one motion score of the plurality of motion scores, wherein the at least one surprise score and the at least one motion score comprise at least one target in the same spatial location in the scene.

* * * * *